United States Patent
Khan

(10) Patent No.: US 7,826,121 B2
(45) Date of Patent: Nov. 2, 2010

(54) USE OF AN ANGLE-SELECTIVE RETRO-REFLECTOR TO RECAPTURE OFF-STATE ENERGY

(75) Inventor: Sajjad A. Khan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 74 days.

(21) Appl. No.: 12/210,860

(22) Filed: Sep. 15, 2008

(65) Prior Publication Data

US 2010/0067086 A1   Mar. 18, 2010

(51) Int. Cl.
*G02B 26/00* (2006.01)
(52) U.S. Cl. ........................ 359/239; 349/113
(58) Field of Classification Search ............... 359/224.2, 359/239; 349/113
See application file for complete search history.

(56) References Cited

U.S. PATENT DOCUMENTS 7,551,247 B2 * 6/2009 Fujiwara et al. ............. 349/113

OTHER PUBLICATIONS

Russel; "A Pulse Width Modulation Algorithm"; U.S. Appl. No. 12/062,266, filed Apr. 3, 2007.
Russel; "A Pulse Width Modulation Algorithm"; U.S. Appl. No. 11/696,033, filed Apr. 3, 2007.
Sajjad A. Khan, et al.; entitled "Spatial Light Modulator-Based Reconfigurabale Optical Add-Drop Multiplexer and Method of Adding an Optical Channel Using the Same" filed Sep. 15, 2008.

* cited by examiner

*Primary Examiner*—Joseph Martinez
(74) *Attorney, Agent, or Firm*—Wade James Brady, III; Frederick J. Telecky, Jr.

(57) ABSTRACT

Provided is a method for using a display system. The method, in one embodiment, includes directing a light beam from a light source to an array of individually addressable pixels of a spatial light modulator. The method further includes modulating the light beam into a first portion of light using a first addressable pixel, and a second portion of light using a second addressable pixel. Thereafter, the method includes directing the first portion of light having a first incident angle and the second portion of light having a second different incident angle toward an angle-selective retro-reflector, the angle-selective retro-reflector configured to transmit the first portion of light onto a display target, and reflect the second portion of light back toward the second addressable pixel. Additionally, the method includes recycling the reflected second portion of light to the pixels of the spatial light modulator.

27 Claims, 8 Drawing Sheets

USE OF AN ANGLE-SELECTIVE RETRO-REFLECTOR TO RECAPTURE OFF-STATE ENERGY

CROSS REFERENCE RELATED APPLICATION

This Application is a related application to Ser. No. 12/210,793 filed on Sep. 15, 2008, entitled "SPATIAL LIGHT MODULATOR-BASED RECONFIGURABLE OPTICAL ADD-DROP MULTIPLEXER AND METHOD OF ADDING AN OPTICAL CHANNEL USING THE SAME," commonly assigned with the present invention and incorporated herein by reference.

TECHNICAL FIELD

The disclosure is directed, in general, to the display of an image and, more specifically, to the recapture of OFF-state energy in the displaying of an image.

BACKGROUND

In current imaging systems that employ spatial light modulators composed of individually addressable pixels, a beam of incident light is directed to the pixels of the spatial light modulator. By setting the pixels in an ON state, the incident light is modulated onto a screen so as to generate bright image pixels on the screen. In this configuration, the modulated light is referred to as the ON-state light, and the pixels in the ON state are referred to as ON-state pixels. By setting the pixels in an OFF state, the incident light is modulated away from the screen so as to cause dark pixels on the screen. In this configuration, the modulated light is referred to as OFF-state light, and the pixels in the OFF state are referred to as OFF-state pixels. For obtaining a high contrast ratio, the OFF-state light is dumped or discarded by the imaging systems, which on the other hand, reduces the total optical throughput to the viewing screen.

Accordingly, what is needed in the art is a method and system for recapturing the OFF-state light.

SUMMARY

To address the above-discussed deficiencies of the prior art, the disclosure provides a method for use in a display system that employs a spatial light modulator that comprises an array of individually addressable pixels. The method, in one embodiment, includes directing a light beam from a light source to an array of individually addressable pixels of a spatial light modulator. The method further includes modulating the light beam into a first portion of light using a first addressable pixel, and a second portion of light using a second addressable pixel. Thereafter, the method includes directing the first portion of light having a first incident angle and the second portion of light having a second different incident angle toward an angle-selective retro-reflector, the angle-selective retro-reflector configured to transmit the first portion of light onto a display target, and reflect the second portion of light back toward the second addressable pixel. Additionally, the method includes recycling the reflected second portion of light to the pixels of the spatial light modulator.

Additionally provided is a display system. The display system, in one embodiment, includes: 1) a light source configured to provide a light beam; 2) a spatial light modulator located in optical communication with the light source and having an array of addressable pixels, wherein a first addressable pixel is configured to modulate the light beam into a first portion of light having a first reflective angle, and a second addressable pixel is configured to modulate the light beam into a second portion of light having a second different reflective angle; 3) an angle-selective retro-reflector located proximate the spatial light modulator and configured to receive the first portion and the second portion, wherein the angle-selective retro-reflector is configured to transmit the first portion of light onto a display target, and reflect the second portion of light back toward the second addressable pixel; and 4) an OFF-state recycling mechanism placed in optical communication with the spatial light modulator, the recycling mechanism configured to capture the reflected second portion of light and redirect it back toward the spatial light modulator.

BRIEF DESCRIPTION OF THE DRAWINGS

For a more complete understanding of the disclosure, reference is now made to the following descriptions taken in conjunction with the accompanying drawings, in which.

DETAILED DESCRIPTION

Disclosed herein are a method and a recycling mechanism for capturing OFF-state light from spatial light modulators in display systems and redirecting the recycled OFF-state light to the spatial light modulators. In the following, the method and the recycling mechanism will be discussed with reference to particular examples. It will be appreciated by those skilled in the art that the following discussion is for demonstration purpose, and should not be interpreted as a limitation. Other variations without departing from the spirit of this disclosure are also applicable.

Figure 1:
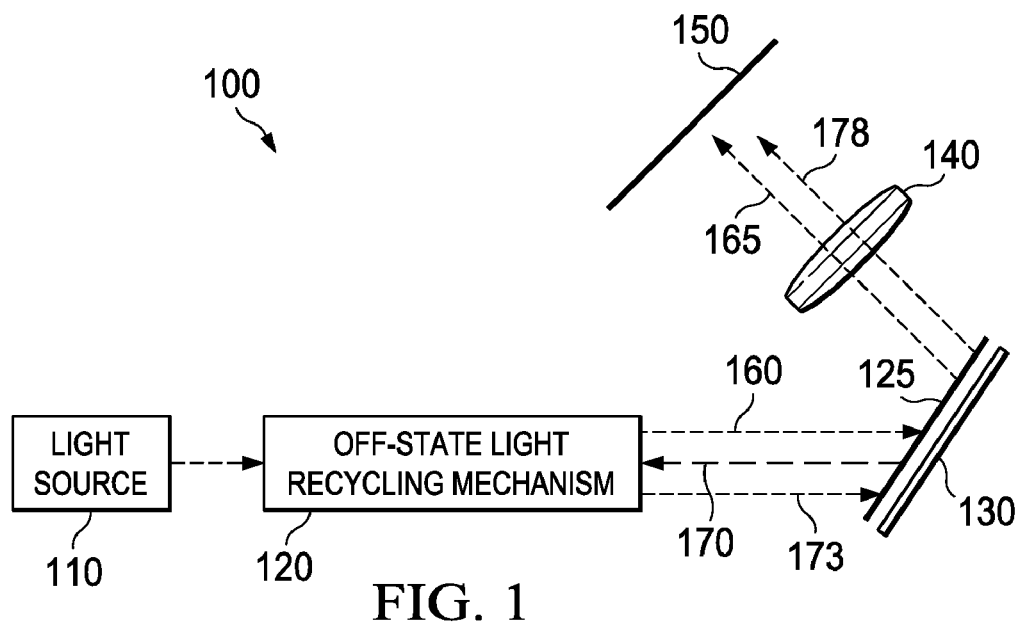
FIG. 1 illustrates one embodiment of a display system in which OFF-state recycling is implemented.

FIG. 1 illustrates one embodiment of a display system 100 in which OFF-state recycling is implemented. The display system 100 comprises a light source 110, OFF-state light recycling mechanism 120, an angle-selective retro-reflector 125, a spatial light modulator 130, a projection lens 140, and a display target 150. The display target 150 can be a screen on a wall or the like, or it can be a member of a rear projection system, such as a rear projection television. In fact, the display system 100 can be any suitable display system, such as a front projector, a rear projection television, or a display unit for use in other systems, such as mobile telephones, personal data assistants (PDAs), hand-held or portable computers, camcorders, video game consoles, and other image displaying devices, such as electronic billboards and aesthetic structures.

Light source 110 provides light for the imaging system 100. The light source 110 may comprise a wide range of light emitting devices, such as lasers, light-emitting-diodes, arc lamps, devices employing free space or waveguide-confined nonlinear optical conversion and many other light emitting devices. In particular, the light source 110 can be a light source with a low etendue, such as solid state light emitting devices (e.g. lasers and light-emitting-diodes (LEDs)). When solid-state light emitting devices are used, the light source 110 may comprise an array of solid-state light emitting devices capable of emitting different colors, such as colors selected from red, green, blue, and white.

Because a single solid-state light emitting device generally has a narrow characteristic bandwidth that may not be optimal for use in display systems employing spatial light modulators, multiple solid-state light emitting devices can be used for providing light of each color so as to achieve optimal bandwidth for specific display systems. For example, multiple lasers or LEDs with slightly different characteristic spectra, such as 20 nm or less characteristic wavelength separation, can be used to produce a color light such that the characteristic spectra of the multiple lasers or LEDs together form an optimal spectrum profile of the display system. Vertical cavity surface emitting lasers (VCSEL) and Novalux™ extended cavity surface emitting lasers (NECSEL), or any other suitable laser emitting devices, may be used in one embodiment.

Figure 2:
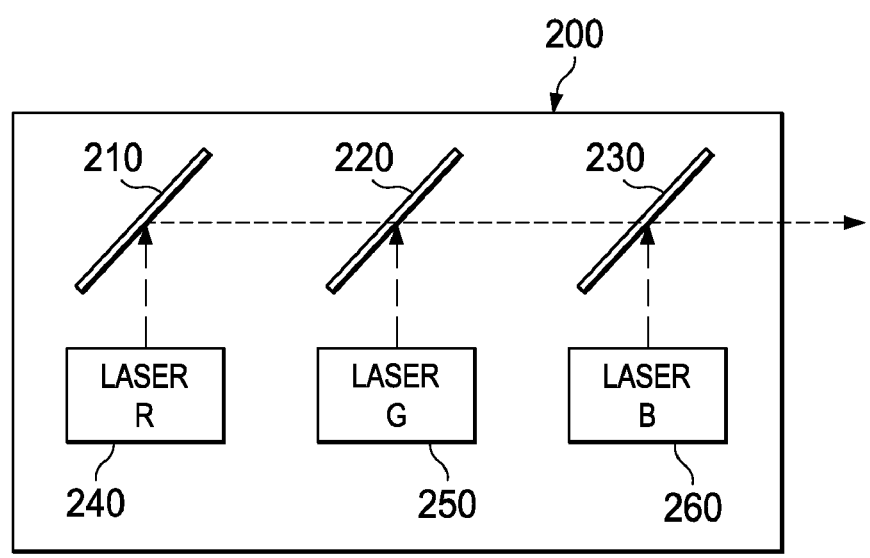
FIG. 2 illustrates a light source including laser light emitting devices as might be used in accordance with this disclosure.

FIG. 2 illustrates a light source 200 of laser emitting devices as might be used in accordance with this disclosure. In FIG. 2, the light source 200 comprises laser R 240, laser G 250, and laser B 260 for emitting light of different colors, such as red, green, and blue colors, respectively. The laser light beams from laser emitting devices 240, 250, and 260 are combined and directed to a spatial light modulator through reflective mirror 210, optical filter 220 that passes the red light and reflects other color spectrums, and optical filter 230 that passes the red and green light components and reflects the blue light spectrum.

In other examples, the light source 200 may have any number of laser emitting devices capable of providing any suitable color, preferably those colors selected from red, green, blue, yellow, magenta, cyan, white, or any combinations thereof. As aforementioned, each light emitting device (240, 250, or 260) may be composed of multiple light emitting devices of slightly different characteristic spectrums so as to achieve optimal spectrum profile for the display system.

Referring again to FIG. 1, spatial light modulator 130 comprises an array of individually addressable pixels for spatially modulating the incident light onto or away from projection lens 140 that projects the modulated light onto screen 150 so as to reproduce an image. The spatial light modulator 130 may comprise pixels of many different natures, such as reflective and deflectable micromirrors. The pixels can be operated using a binary mode, among others. In the binary mode, each pixel is switched between an ON and OFF state. In the ON state, each pixel modulates the incident light toward the angle-selective retro-reflector 125 at an angle ($\theta_t$) sufficient to cause the incident light to transmit there through, and thus toward the projection lens 140. In the OFF state, each pixel modulates the incident light at an angle ($\theta_r$) sufficient to cause the incident light to reflect back from the angle-selective retro-reflector 125 toward the pixel. The ON-state light arrives at the screen 150 via the projection lens 140 so as to construct the desired image. The OFF-state light, however, is recycled by the OFF-state light recycling mechanism 120 and thus redirected to the spatial light modulator 130. The details of this recycling will be discussed in length below.

As those skilled in the art are aware, color and gray images can be produced using a pulse-width-modulation technique, such as those disclosed in "A Pulse Width Modulation Algorithm," Ser. No. 12/062,266; and "A Pulse Width Modulation Algorithm," Ser. No. 11/696,033, both to Russell and filed on Apr. 3, 2007, the subject matter of each is incorporated herein by reference in its entirety.

Disposed between the spatial light modulator 130 and the screen 150 (as well as the OFF-state light recycling mechanism 120 in certain embodiments) is the angle-selective retro-reflector 125. The term "angle-selective retro-reflector", as used throughout this disclosure, means a material layer having transmit/reflect selectivity based upon an angle (e.g., from a plane perpendicular thereto) that a beam of light hits it. Depending on an angle that a beam of light hits the angle-selective retro-reflector, the angle-selective retro-reflector will either transmit the beam of light, or reflect the beam of light in an angle substantially similar to the incident angle. For example, in one embodiment the angle-selective retro-reflector might transmit a light beam that has a zero degree incident angle, wherein it might reflect a beam of light having a thirty degree incident angle. In this embodiment, the reflected beam of light would have a reflective path that substantially follows its incident path. In certain other embodiments, the angle-selective retro-reflector is not only selective based upon an angle of incidence, but also selective based upon a wavelength of the incident beam of light. Accordingly, the angle-selective retro-reflector is not only angle-selective, but also wavelength selective in certain embodiments. More detail regarding the angle-selective retro-reflector will be discussed in the following paragraphs.

OFF-state light recycling mechanism 120 is optically coupled to the propagation path of the OFF-state light that is modulated from the pixels of the spatial light modulator 130 via the angle-selective retro-reflector 125. Accordingly, the OFF-state light from the pixels at the OFF state of the spatial light modulator can be recaptured by the OFF-state light recycling mechanism. For redirecting the recaptured OFF-state light back to the pixels of the spatial light modulator, the OFF-state light recycling mechanism 120 has a light exit end that is aligned to the propagation path between the incident light and the pixels of the spatial light modulator.

As an example shown in FIG. 1, incident light 160 from the light source 110 impinges on spatial light modulator 130, which modulates the incident light 160 into ON-state light 165 and OFF-state light 170. For example, the spatial light modulator 130 modulates that incident light 160 such that different portions thereof impinge upon the angle-selective retro-reflector 125 at different angles. In the embodiment shown, the spatial light modulator 130 causes the ON-state light 165 to impinge upon the angle-selective retro-reflector 125 at an angle ($\theta_t$) designed to allow the ON-state light 165 to transmit there through. In this example, the ON state light 165 travels towards projection lens 140, and thus projected onto screen 150. However, as illustrated in the embodiment of FIG. 1, the spatial light modulator 130 also causes the OFF-state light 170 to impinge upon the angle-selective retro-reflector 125 at an angle ($\theta_r$) designed to cause the OFF-state light 170 to reflect there from. Therefore, the OFF-state light 170 is reflected back toward the spatial light modulator 130 (e.g., following a path substantially similar to a path of the incident light 160) to be recaptured by OFF-state light recycling mechanism 120

The OFF-state light recycling mechanism 120 is configured to receive the OFF-state light 170 reflected back from the angle-selective retro-reflector 125 and the spatial light modulator 130. The OFF-state light recycling mechanism 120 is thereafter capable of converting the recaptured OFF-state light 170 into incident light 173, and redirecting incident light 173 to illuminate pixels of spatial light modulator 130. At the spatial light modulator 130, redirected incident light 173 is modulated into ON-state light 178 and/or OFF-state light (not shown). The ON-state light 178 is again collected by projection lens 140. The OFF-state light (if any) can be recaptured by the OFF-state light recycling mechanism 120 in a manner as just discussed.

Because the OFF-state light 170 from the spatial light modulator 130 can be recaptured and redirected to the spatial light modulator 130, this recycling process improves the brightness of images produced on the screen. Such brightness improvement may, in certain instances, be mathematically described as brightness gain, as expressed in equation 1:

$$I = I_o G = I_o \frac{1}{1 - \varepsilon(1 - x)}$$

In equation 1, G is the brightness gain due to OFF-state light recycling, I is the illumination intensity of light arriving at the screen including the recycled OFF-state light, and Io is the illumination intensity of light arriving at the screen without OFF-sate light recycling. $\varepsilon$ is the OFF-state light recycling efficiency that is defined as the fraction of the OFF-state light that re-illuminates the pixels of the spatial light modulator after a recycling process, compared to the total amount of OFF-state light to be recycled by the recycling process. x is the normalized number of ON-state pixels of the spatial light modulator at a time (e.g. during a bitplane time). Specifically, x can be expressed as equation 2:

$$x = \frac{N_{ON}}{N_{total}}$$

wherein, $N_{ON}$ is the number of ON-state pixels at a time, and $N_{total}$ is the total number of pixels involved in modulating the incident light. It is noted that $N_{total}$ may or may not be the total number of pixels of the spatial light modulator, especially when the spatial light modulator comprises active and inactive pixel areas. Pixels in inactive pixel areas of spatial light modulators are those pixels whose states in image display operations are independent from the data (e.g. bitplane data) derived from desired images. Alternatively, pixels in active pixel areas are those whose states are associated with or determined by the image data.

Recycling efficiency $\varepsilon$ is primarily determined by the optical design of the OFF-state light recycling mechanism and the optical coupling of the OFF-state light recycling mechanism to the display system. The propagation path of the OFF-state light from the spatial light modulator and the propagation path of the light incident to the spatial light modulator is important in this determination. In certain embodiments, $\varepsilon$ is 100%. In practice, $\varepsilon$ may be less than 100% due to imperfect optical coupling of the OFF-state light recycling mechanism to the propagation path of the OFF-state light from the spatial light modulator and/or to the propagation path of the incident light to the spatial light modulator and/or due to light leakage from imperfect optical design of the OFF-state light recycling mechanism. To substantially maximize the brightness gain, $\varepsilon$ may be substantially maximized. In other examples, however, substantially. maximizing OFF-state light recycling may be impeded by other system features, which results in balance between OFF-state recycling and the features. For example, if the OFF-state light recycling mechanism and/or the system design is desired to be cost-effective or desired to be volume compact or other reasons, poor $\varepsilon$ may be selected. In most instances, $\varepsilon$ is 10% or more, such as 20% or more, 30% or more, 40% or more, 50% or more, 60% or more, and 70% or more. As an example, Table 1 shows the brightness gain achieved from different number of ON-state pixels (which can be converted to the number of OFF-state pixels using equation 2) by assuming that the recycling efficiency $\varepsilon$ is 60%.

TABLE 1

| | % of ON-State pixels | | | | | | | | | |
|---|---|---|---|---|---|---|---|---|---|---|
| | 10 | 20 | 30 | 40 | 50 | 60 | 70 | 80 | 90 | 100 |
| Brightness gain | 2.17 | 1.92 | 1.72 | 1.56 | 1.43 | 1.32 | 1.22 | 1.14 | 1.06 | 1 |

Figure 3:
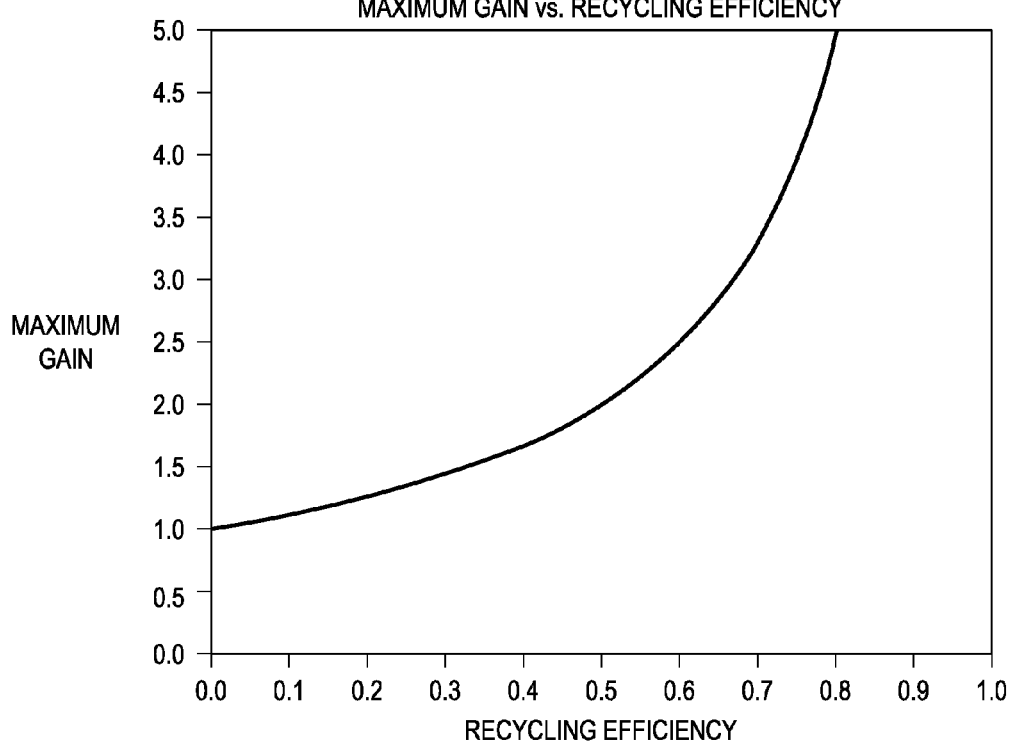
FIG. 3 illustrates a variation of the maximum gain with the recycling efficiency.

One variation of the maximum gain with the recycling efficiency is presented in FIG. 3. The diagram in FIG. 3 assumes that all pixels of the spatial light modulator are at the OFF state. Accordingly, equation 1 is reduced to equation 3 with the recycling efficiency being the variable as shown in the following:

$$G = \frac{1}{1 - \varepsilon}$$

As can be seen in FIG. 3, the maximum gain is about 1 when the recycling efficiency $\varepsilon$ is about 0; and the maximum gain is about 5 when $\varepsilon$ is about 0.8.

Figure 4:
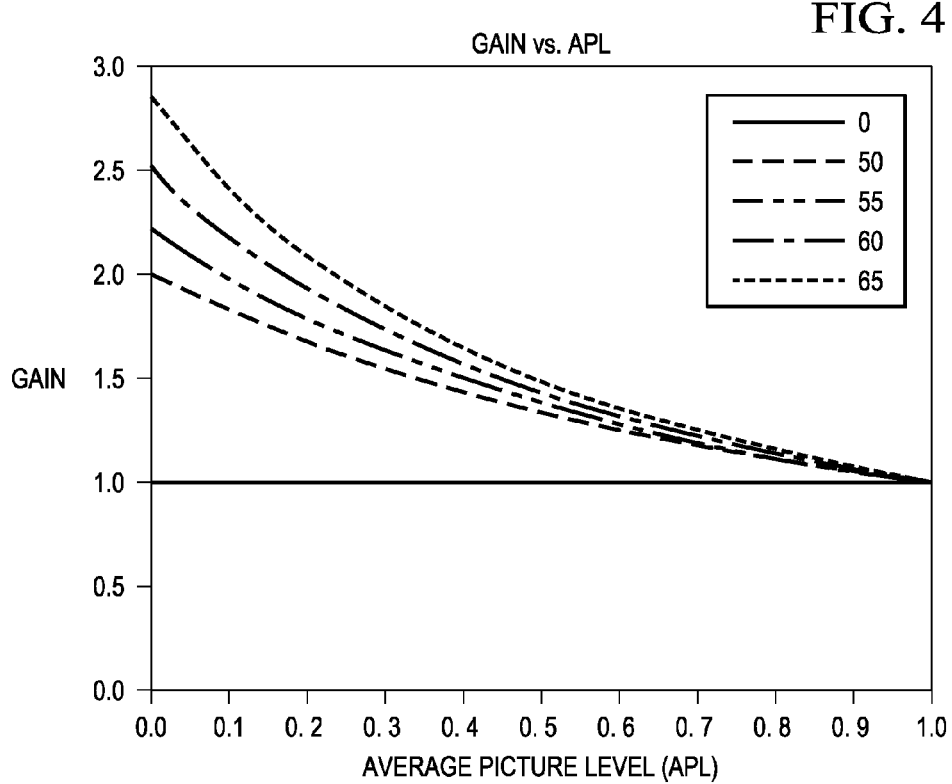
FIG. 4 illustrates a diagram of the gain vs. the average-picture-level (APL) in a bitplane with different curves representing different recycling efficiencies.

Because the gain is due to the OFF-state recycling, the amount of gain obtained through OFF-state recycling depends on the number of OFF-state pixels of the spatial light modulator during the recycling process. As an example, FIG. 4 presents a diagram of the gain vs. the average-picture-level (APL) in a bitplane with different curves representing different recycling efficiencies. The APL is defined as the fraction of the ON-state pixel data (e.g. the total number of "1") in a bitplane. As can be seen in FIG. 4, gain increases as APL decreases. A substantially white image has least gain, and thus least brightness boost; whereas a substantially dark image has the most gain, and thus the most brightness boost.

Figure 5:
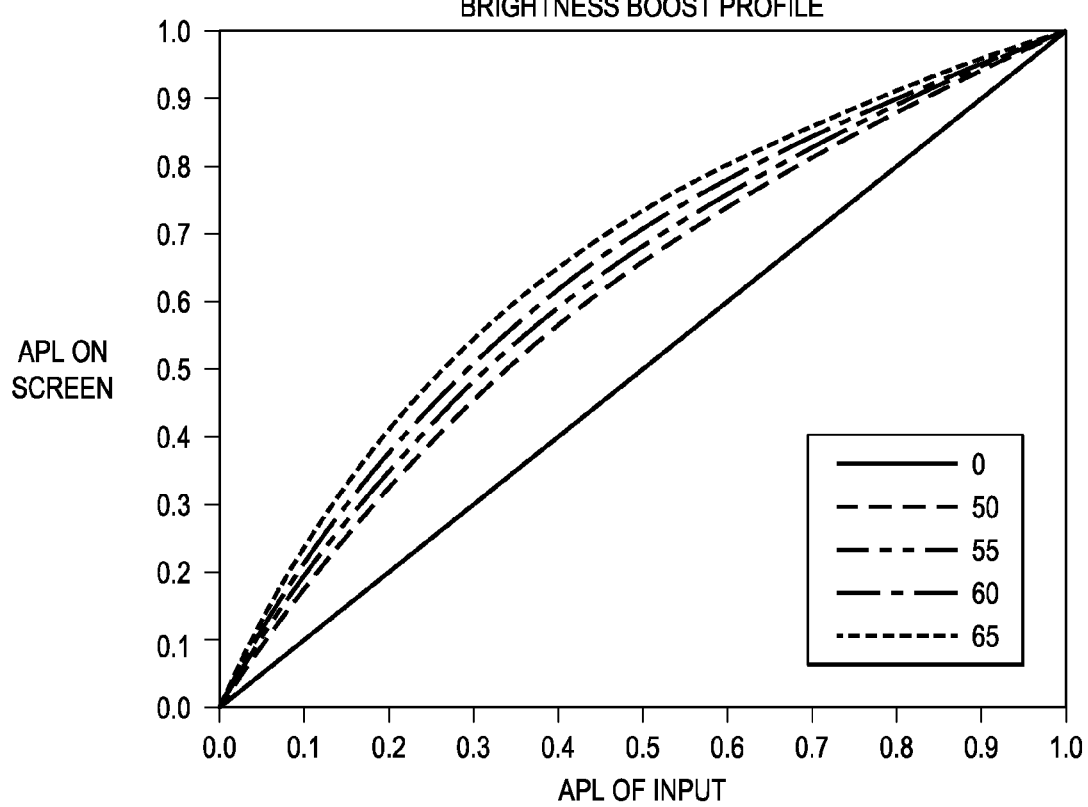
FIG. 5 illustrates the brightness boost profile represented by the variation of the APL of the produced image on the screen to the APL of the input image.

FIG. 5 shows the brightness boost profile represented by the variation of the APL of the produced image on the screen to the APL of the input image. Different curves represent different recycling efficiencies. When the recycling efficiency is zero, the APL on screen is the same as the APL of the input image, as shown in the 45° straight line. As the recycling efficiency increases from zero, the APL on screen deviates from the straight line and evolves into curved lines. Each point on the APL-on-screen curve has a larger y value (APL on screen value) than the y value of the straight line with the same x coordinates (APL of input image). The amplitude of such deviation is determined by the amount of recycled OFF-state light.

In addition to the brightness improvement as discussed above, the OFF-state light recycling has many other benefits. For example, the OFF-state recycling can also be used to increase the lifetime of the light source of the imaging system and/or to reduce the power consumption of the imaging system. Specifically, the light source can be operated at a lower power, as compared to imaging operations without OFF-state light recycling, during imaging operations but without sacrificing the brightness of the reproduced images. Operating the light source at reduced power certainly helps to increase lifetime of the light source, especially solid-state light sources, such as lasers and LEDs. Moreover, reduced power also reduces heat generated by the light source, which in turn increases lifetime of other components in the system by for example, reducing the commonly existing aging effect.

Figure 6:
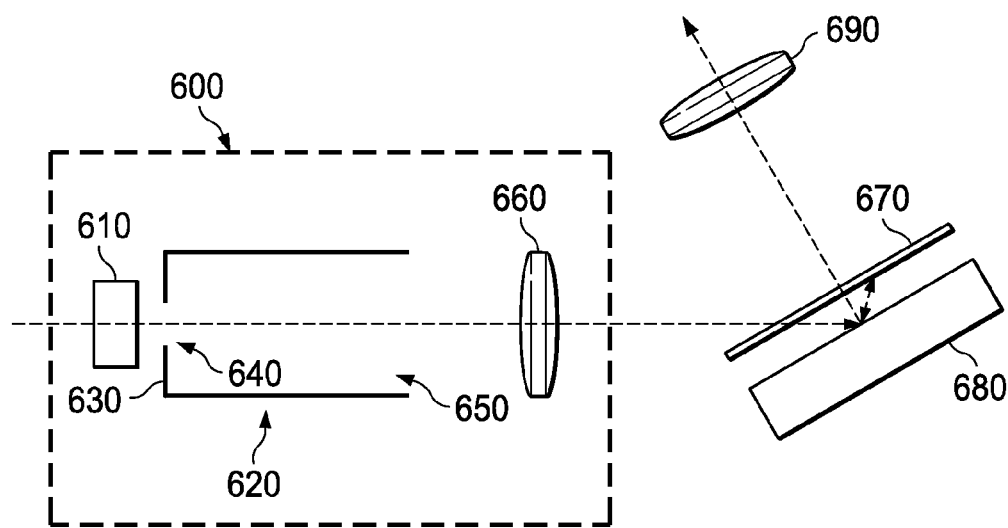
FIG. 6 illustrates an implementation of an OFF-state light recycling mechanism.

An OFF-state light recycling mechanism, such as the OFF-state light recycling mechanism 120 of FIG. 1, can be implemented in many possible ways, one of which is schematically illustrated in FIG. 6. Referring to FIG. 6, an OFF-state light recycling mechanism 600 comprises an optical diffuser 610, an optical integrator 620, and condensing lens 660. For illustrating the relative positions of the OFF-state light recycling mechanism 600 in the imaging system, an angle-selective retro-reflector 670, a spatial light modulator 680 and a projection lens 690, for example similar to those shown in FIG. 1 in one embodiment, are also shown in the figure.

Optical diffuser 610 is provided herein for homogenizing the light beam incident thereto and transforming the incident light beam, especially narrow-band or narrow-angle light beans from solid-state light emitting devices, into light beams with pre-determined illumination field profiles. A narrow-angle light beam is referred to as a light beam with a solid-angle extension of 5 degrees or less, such as 2 degrees or less, 1 degree or less, 0.5 degree or less, and 0.2 degree or less. The homogenization capability of the optical diffuser 610 is enabled by randomly or regularly deployed scattering centers. The scattering centers can be located within the body of the diffuser or in (or on) a surface(s) of the diffuser, which constitute the features responsible for directing the incident light into various spatial directions within the spread of the optical diffuser. Depending upon different locations of the scattering centers, the optical diffuser can be a volume optical diffuser where the scattering centers are within the bulk body of the diffuser, or a surface diffuser where the scattering centers are on the surface of the bulk body of the diffuser. In one example, the optical diffuser 610 can be a surface diffuser, such as a standard engineered diffuser. Even though not required, the optical diffuser 610 can be used when the light source (e.g., 110 in FIG. 1) employs solid state (or narrow band) light sources. In other examples, such as when the light source uses arc lamps, the optical diffuser 610 may be replaced by an optical lens, such as a condensing lens, which is not shown in the figure. A lens combined with small angle diffusers can also be used.

The optical integrator 620 comprises opening 640 formed in end wall 630 of the optical integrator. End wall 630 has interior surface coated with a reflective layer for reflecting the light incident thereto. In particular, the interior surface of end wall 630 is used to reverse the direction of the incident light such that the OFF-state light recaptured at the other end 650 of optical integrator 620 can be bounced back to travel towards the spatial light modulator. For this purpose, the reflective layer coated on the interior surface of end wall 630 can be a totally-internally-reflecting (TIR) surface for the OFF-state light.

Opening 640 provided in end wall 630 is designated for collecting the light beams from the light source and directing the collected light towards the spatial light modulator 680. Accordingly, opening 640 is optically aligned to the propagation path of the incident light from the light source, as illustrated in the figure.

Because the opening 640 is provided to collect the incident light, and the opening 640 is in the end wall 630 that is designated to bounce the recaptured OFF-state light, the opening 640 has a preferred dimension such that OFF-state light leakage from the opening is minimized while collection of the incident light from the light source is maximized. The opening 640 may have a dimension that is matched to the dimension of the light incident thereto, such as the dimension of the illumination field of the light beam at the location of side wall 630. As an example, the width or height of the opening can be about 1 nm or less, such as 0.5 mm or less, and 0.2 mm or less. The opening 640 may have any desired shape, such as circle, rectangle, and square.

The other end 650 of optical integrator 620 is designated to capture the OFF-state light reflected from the angle-selective retro-reflector 670 and the spatial light modulator 680. To maximize the capturing of the OFF-state light, end 650 of optical integrator 620 is substantially open; and the opened portion is optically aligned to the propagation path of the OFF-state light from the spatial light modulator 680. In particular, the opening portion of end 650 can be optically aligned to the illumination field of the OFF-state light at the location of end 650. Even though it is shown in the figure that the end 650 and the end 630 are substantially parallel and substantially have the same dimension, it is not required. In other examples, end 650 may have a shape and/or a dimension different from that of the end 630, in which instance, optical integrator 620 can be tapered or extended from one end to the other. Alternatively, optical integrator 620 can be assembled with another optical integrator or a suitable optical element (e.g. lens) such that capturing the OFF-state light from the spatial light modulator can be improved (e.g., maximized).

Optical integrator 620 may have a solid body, such as a body filled with an optical material (e.g. glass) that is transmissive to the incident light. The optical integrator 620 may alternatively comprise a hollowed body, such as an empty space surrounded by multiple reflective walls, one end-side wall 630, and the other side 650, as discussed above.

The incident light, including the light from the light source and the recycled light from the OFF-state light recycling mechanism 600, may be guided to the spatial light modulator 680 by condensing lens 660. The condensing lens 660 is provided to form a proper illumination field, such that the image of such illumination field projected on the spatial light modulator 680 has a proper optical profile. For example, the profile has an illumination area matching the pixel area of the spatial light modulator and/or the illumination intensity is substantially uniform across the pixel area. A proper optical profile can be achieved by adjusting the relative position of the condensing lens 660 with respect to the spatial light modulator 680.

In the example shown in FIG. 6, optical integrator 620 is disposed on the optical path of the light from the light source. A benefit of this configuration is that the recycled OFF-state light can be re-directed to the spatial light modulator 680 along the same propagation path of the incident light from the light source, thus simplifying the optical design. In other alternative examples, the optical integrator 620 can be disposed such that the optical axis of the optical integrator is not aligned to the incident light path. In this instance, opening 640 may not be formed.

Figure 7A:
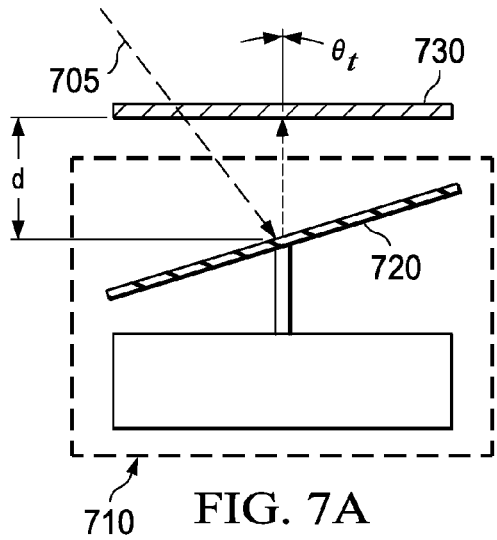
FIGS. 7A thru 7D illustrate various implementations of an angle-selective retro-reflector.
Figure 7B:
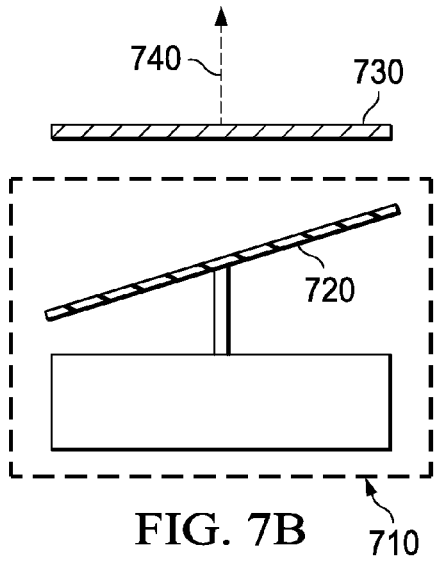

An angle-selective retro-reflector, such as the angle-selective retro-reflector 125 of FIG. 1, can be implemented in many possible ways, one of which is schematically illustrated in FIGS. 7A thru 7D. FIGS. 7A and 7B illustrate a micromirror 720 of a spatial light modulator 710 positioned at an ON-state. When in the ON-state, the micromirror 720 directs the incident beam of light 705 to the angle-selective retro-reflector 730 at a transmit incident angle $(\theta_t)$ for the chief ray of the incident light beam, such as shown in FIG. 7A. While the incident beam of light 705 is illustrated as a line, those skilled in the art understand that it has an inherent cone angle, such as a small cone angle in certain embodiments. When the transmit angle $(\theta_t)$ is chosen properly, a transmitted beam of light 740 goes through the angle-selective retro-reflector 730 on its way to a viewing surface, such as shown in FIG. 7B. In the example embodiment of FIGS. 7A and 7B, the transmit angle $(\theta_t)$ for the chief ray of the incident light beam is about zero degrees (e.g., measured from surface normal). Nevertheless, depending on the design of the angle-selective retro-reflector 730, this transmit angle $(\theta_t)$ for the chief ray of the incident light beam can change, for example from about zero degrees to about 6 degrees, as measured from surface normal.

Figure 7C:
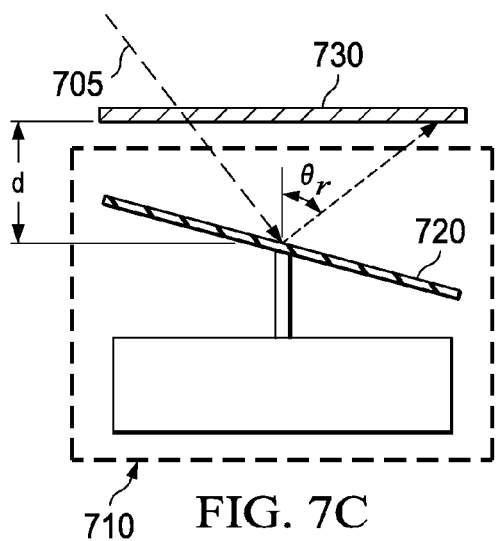
Figure 7D:
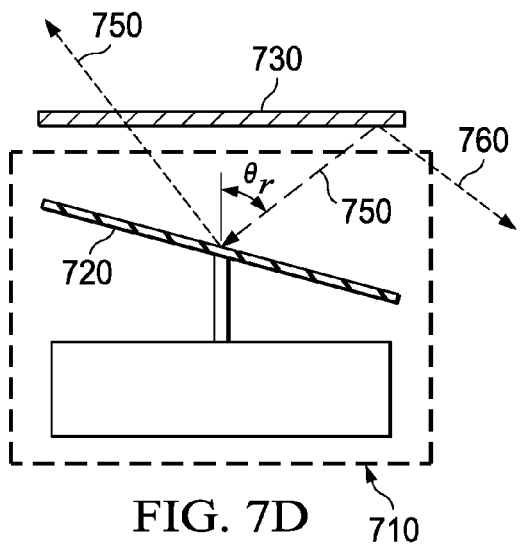

FIGS. 7C and 7D illustrate the micromirror 720 positioned at an OFF-state. When in the OFF-state, the micromirror 720 directs the incident beam of light 705 to the angle-selective retro-reflector 730 at a reflective incident angle $(\theta_r)$ for the chief ray of the incident light beam, such as shown in FIG. 7C. When the reflective angle $(\theta_r)$ for the chief ray of the incident light beam is chosen properly, the incident beam of light 705 is reflected back toward the micromirror 720 as a reflected beam of light 750, such as shown in FIG. 7D. In the example embodiment of FIGS. 7C and 7D, the reflective angle $(\theta_r)$ for the chief ray of the incident light beam is about thirty degrees (e.g., measured from surface normal). Nevertheless, depending on the design of the angle-selective retro-reflector 730, this reflective angle $(\theta_r)$ for the chief ray of the incident light beam can also change, for example from about 20.0 degrees to about 80.0 degrees, as taken from surface normal.

The reflected beam of light 750, in contrast to what one would believe, does not follow the half angle theorem. For example, the reflected beam of light 750 does not reflect from the angle-selective retro-reflector 730 at an angle equal to but opposite in direction as the incident angle, such as shown by the dotted line 760. In contrast, the reflected beam of light 750 reflects back at substantially the same angle and direction as the incident beam of light 705. Accordingly, in this embodiment the incident beam of light 705 and the reflected beam of light 750 follow substantially (if not exactly) the same path, as shown in FIGS. 7C and 7D.

The angle-selective retro-reflector 730, in one embodiment, should be positioned within a short distance (d) from the micromirror 720. In one example embodiment, the distance (d) should be less than about half a depth of focus of the incident light beam. For example, if the incident light beam has a large diverging cone angle as it approaches the angle-selective retro-reflector, and this distance (d) is large, efficiency will be lost due to the small angular acceptance angle of the angle-selective retro-reflector. Therefore, the placement of the angle-selective retro-reflector 730 relative to the micromirror 720 is important.

In one embodiment, the angle-selective retro-reflector 730 can be designed to adhere to the inside of the transparent glass window used for the Digital Micromirror Device. (See FIGS. 10A thru 10D in one example). Those skilled in the art understand the processes that might be used to adhere the angle-selective retro-reflector 730 to the inside of the transparent glass window. This can significantly reduce cost and size and improve system efficiency while providing the added benefit of a compact form factor.

Angle-selective retro-reflectors, manufactured in accordance with this disclosure, can take on various different configurations. For instance, angle-selective retro-reflectors can be manufactured to operate in a passive configuration or active configuration, depending on the desires of the end user. In either configuration, whether active or passive, the angle-selective retro-reflectors can be configured to reflect one or more wavelengths of light incident thereon, or alternative transmit one or more wavelengths of light incident thereon, depending on the incident angle thereof.

In the passive configuration, the angle-selective retro-reflectors reflect or transmit incident light based upon an incident angle thereof. Accordingly, there is no mechanism in the passive configuration to switch OFF the angle-selective retro-reflector. While this configuration may be somewhat limiting, it would allow the display system to exclude a light trap, which is typically needed to catch light from pixels in the OFF-state.

In the active configuration, the angle-selective retro-reflectors can be switched ON or OFF, depending on the needs of the system. When switched ON, the angle-selective retro-reflector either reflects or transmits incident light based upon the incident angle thereof. However, when switched OFF, the angle-selective retro-reflector transmits incident light regardless of the incident angle thereof.

This active configuration allows the angle-selective retro-reflector to be transparent to the display system, when desired. For instance, in certain circumstances there is a desire that the OFF-state light beams not be recycled. One such circumstance exists wherein only a very few pixels are in the ON-state. In this circumstance, a majority of the light beam incident upon the spatial light modulator will be recycled to these very few ON-state pixels, causing the contrast ratio (e.g., full on full OFF (FOFO) contrast ratio) of the display system to substantially decrease. Accordingly, the active configuration allows the angle-selective retro-reflector to be switched OFF, thus improving the contrast ratio in such circumstances. In the configuration wherein the angle-selective retro-reflector is switched OFF, a traditional light trap may be appropriately placed to trap the light discarded from the OFF-state pixels.

The active configuration, in certain embodiments, additionally allows the user of the angle-selective retro-reflector to actively switch the wavelength(s) of light that it can reflect. For example, the active configuration might allow the angle-selective retro-reflector to reflect/transmit certain wavelengths of light (e.g., those associated with red light in one embodiment), depending on the incident angle thereof, while only transmit other wavelengths of light (e.g., those associated with green and blue light in one embodiment), regardless of the incident angle thereof. In this configuration, the angle-selective retro-reflector could be synchronized with an appropriate pulse-width-modulation technique, one of which is briefly discussed above.

The angle-selective retro-reflector, when in the active configuration, may be switched ON or OFF very quickly. For example, switching speeds of milliseconds or even microseconds can be achieved, depending on the design thereof.

Accordingly, the switching speed of the angle-selective retro-reflector should not be a problem in the design or operation of any display system it is placed within, particularly when needed for pulse-width-modulation.

Figure 8A:
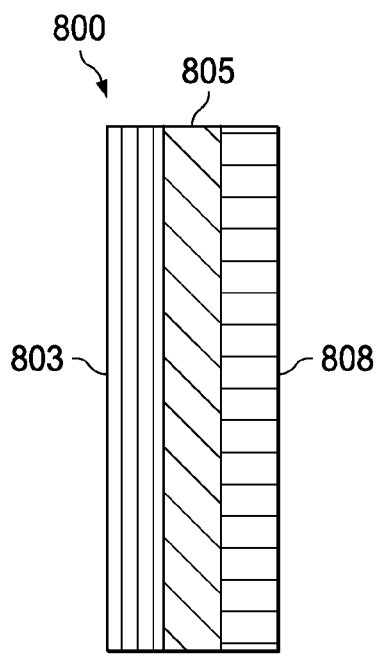
FIGS. 8A thru 8C illustrate various different configurations for an angle-selective retro-reflector.
Figure 8B:
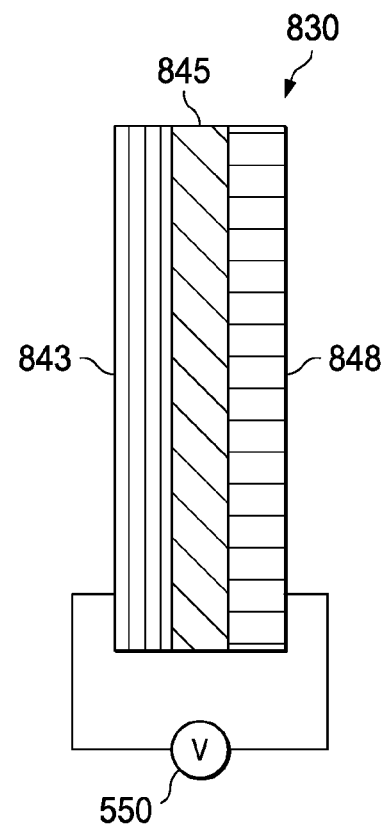
Figure 8C:
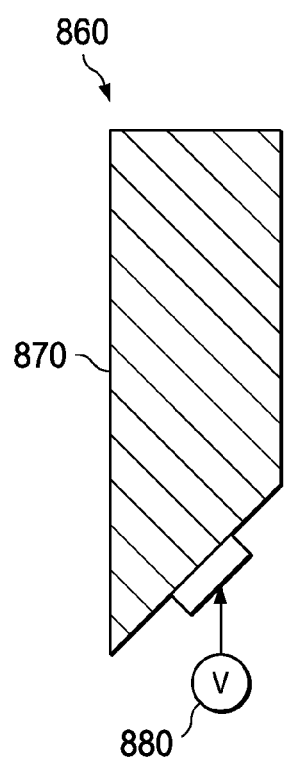

FIGS. 8A thru 8C illustrate various different configurations for an angle-selective retro-reflector. FIG. 8A illustrates a passive angle-selective retro-reflector 800 manufactured in accordance with the disclosure. The passive angle-selective retro-reflector 800, among others, may comprise one or more wavelength tuned material regions. For instance, the passive angle-selective retro-reflector 800 may comprise a stack of wavelength tuned material regions, one of which is tuned to red light beams, one of which is tuned to green light beams, and one of which is tuned to blue light beams. In certain embodiments each of the wavelength tuned material regions comprises a separate material layer, wherein other embodiments each of the wavelength tuned material regions are formed within a single material layer. In an alternative embodiment, the passive angle-selective retro-reflector 800 comprises a single wavelength tuned material region.

The passive angle-selective retro-reflector 800 of FIG. 8A includes a first material region 803 tuned for one wavelength (e.g., red), a second material region 805 tuned for another wavelength (e.g., green), and a third material region 808 tuned for yet another wavelength (e.g., blue). The first, second and third material regions 803, 805, 808, depending on the design, may comprise a stack of wavelength tuned volume Bragg gratings. In an alternative design, the first, second and third material regions 803, 805, 808, may comprise a stack of wavelength tuned holographic optical elements. Both of these embodiments are particularly useful for display systems employing narrow band light sources, such as lasers and LEDs.

Those skilled in the art understand the processes that might be required to manufacture the first, second and third material regions 803, 805, 808, depending on whether they comprise a stack of wavelength tuned volume Bragg gratings or a stack of wavelength tuned holographic optical elements. For instance, those skilled in the art understand that the first, second and third material regions 803, 805, 808, may be manufactured to include high angular reflectivity to let the ON-state incident through but reflect the OFF-state light back to the spatial light modulator. Those skilled in the art further understand the processes required to manufacture the first, second and third material regions 803, 805, 808, having a specific angular reflectivity.

In one instance, the first, second and third material regions 803, 805, 808, are manufactured to substantially reflect incident light at about 48 degrees (e.g., with respect to surface normal). As many spatial light modulators employing an array of micromirrors are currently calibrated to provide an incident angle of about 48 degrees (e.g., the OFF-state light beam already reflects at this angle toward the light trap), very few changes need be made to the display system. If the first, second and third material regions 803, 805, 808, were designed to reflect incident light at about 35 degrees, which is possible to obtain, the spatial light modulators would then need to be calibrated to provide this different incident light angle.

A passive angle-selective retro-reflector, such as that discussed above, may further be purchased through third-party sources. For instance, applicable wavelength tuned volume Bragg gratings may be purchased through companies such as OptiGrate, Ondax, etc. Additionally, applicable wavelength tuned holographic optical elements may be purchased through companies such as Wasatch Photonics, Kaiser EO, etc.

The passive angle-selective retro-reflector 800 may additionally comprise a chirped volume Bragg grating, as opposed to the stacked layers. While this embodiment is not illustrated in FIG. 8A, the chirped volume Bragg grating would be chirped in the z-direction, which is the direction of the propagation of light therein. This embodiment would be particularly useful for display systems using a broadband light source, such as a projection lamp. Those skilled in the art understand the manufacturing processes required to produce such a z-chirped volume Bragg grating, particularly one having the ability to transmit incident beams of light at one angle while reflecting incident beams of light at a different angle.

FIG. 8B illustrates a switchable angle-selective retro-reflector 830 manufactured in accordance with the disclosure. The switchable angle-selective retro-reflector 830, as opposed to its passive counterpart, may be switched ON and OFF depending on the desires of the system. For example, a voltage V may be applied across the angle-selective retro-reflector 830 to switch it, or even a portion of it, between the ON and OFF state, or vice versa. In turning the switchable angle-selective retro-reflector OFF, it may become substantially transparent to the display system, such as discussed above. In turning it ON, it may transmit/reflect the incident beam of light based upon the incident angle thereof.

The switchable angle-selective retro-reflector 830 of FIG. 8B includes a first material region 843 tuned for one wavelength (e.g., red), a second material region 845 tuned for another wavelength (e.g., green), and a third material region 848 tuned for yet another wavelength (e.g., blue). The first, second and third material regions 843, 845, 848 may be collectively or independently switched between the ON and OFF state in the embodiment of FIG. 8B. Accordingly, each of the first, second and third material regions 843, 845, 848 may comprise a material configured to be switched.

In one example embodiment, the first, second and third material regions 843, 845, 848 comprise, among others, a stack of wavelength tuned polymer-dispersed liquid crystal gratings. Each of the wavelength tuned polymer-dispersed liquid crystal gratings would be configured to transmit or reflect an incident beam of light depending on the incident angle thereof, as well as may be actively switched ON and OFF, for example by applying a voltage thereto. This particular embodiment is well suited for applications using an array of narrow band light sources, such as lasers and LEDs.

In another embodiment, not shown, the switchable angle-selective retro-reflector 830 comprises a single material region. For example, the switchable angle-selective retro-reflector 830 could comprise a single active polymer-dispersed liquid crystal grating. The single active polymer-dispersed liquid crystal grating, in this embodiment, would be best used by a display system employing a monochrome illumination source.

FIG. 8C illustrates an alternative switchable angle-selective retro-reflector 860 manufactured in accordance with the disclosure. The switchable angle-selective retro-reflector 860 includes an active acousto-optic Bragg grating 870. The acousto-optic Bragg grating 870, in this embodiment, is configured to switch between an ON state and an OFF state depending on a pressure wave propagating there through. For example, an acousto-optic transducer 880 can be used to propagate an acoustic wave through the acousto-optic Bragg grating 870, and thus switch it between an ON state and an OFF state. Additionally, a pitch of the pressure wave may be modulated to cause the acousto-optic Bragg grating to transmit or reflect certain specific wavelengths of light, depending on the incident angle thereof. In yet another alternative embodiment, not shown, the switchable angle-selective retro-reflector 860 may comprise a phased array of acousto-optic Bragg gratings. In this embodiment, the phased array will be used to precisely control the propagation direction of the retro-reflected beam towards the Micromirror for recycling purposes, by appropriately controlling the different phase elements of the phased array.

Those skilled in the art understand the manufacturing processes needed to manufacture the switchable angle-selective retro-reflector 830 or switchable angle-selective retro-reflector 860. In general, given the teachings herein, one skilled in the art could use known manufacturing processes for their manufacture. Additionally, the switchable angle-selective retro-reflectors 830, 860 of FIGS. 8B and 8C may be used in conjunction with a pulse-width-modulation technique, as discussed above.

Figure 9A:
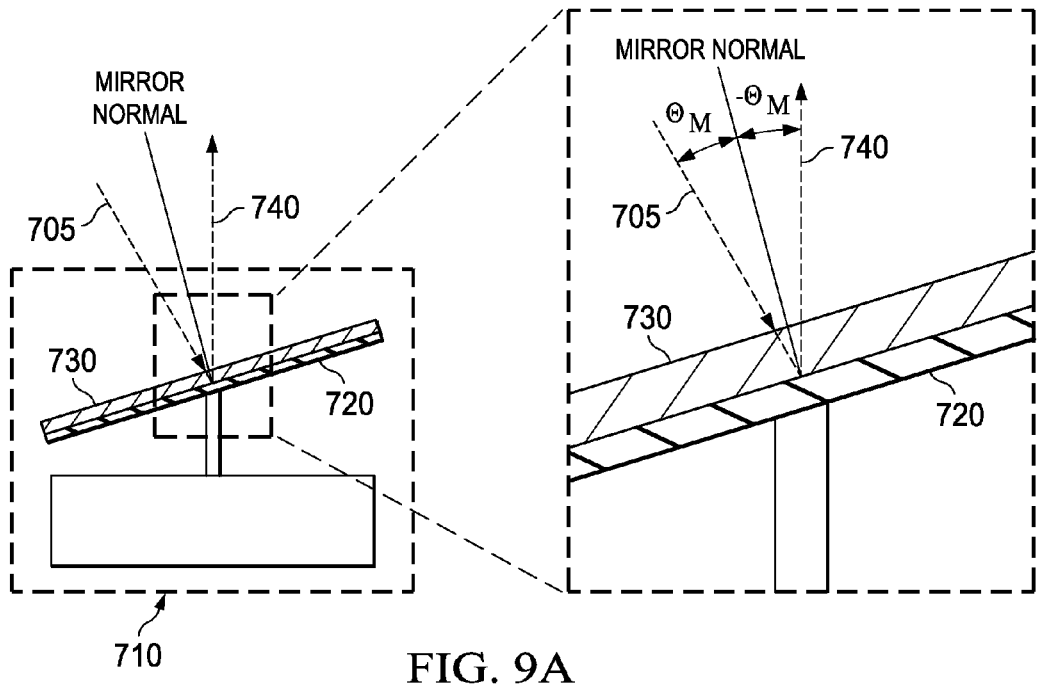
FIGS. 9A thru 10D illustrate various other implementations of an angle-selective retro-reflector.
Figure 9B:
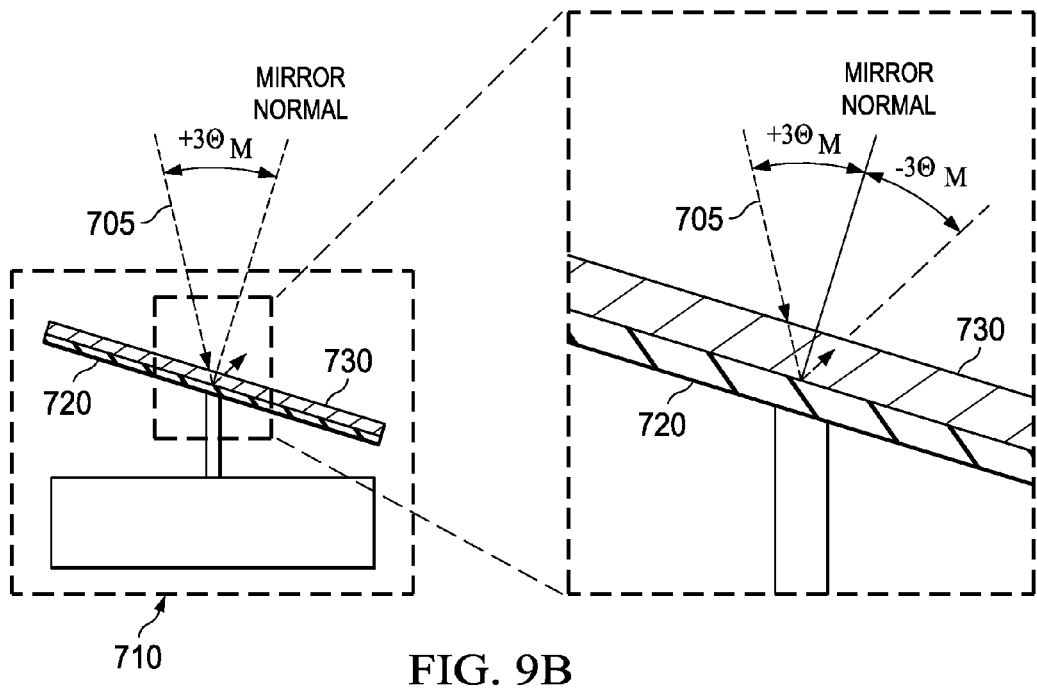
Figure 9C:
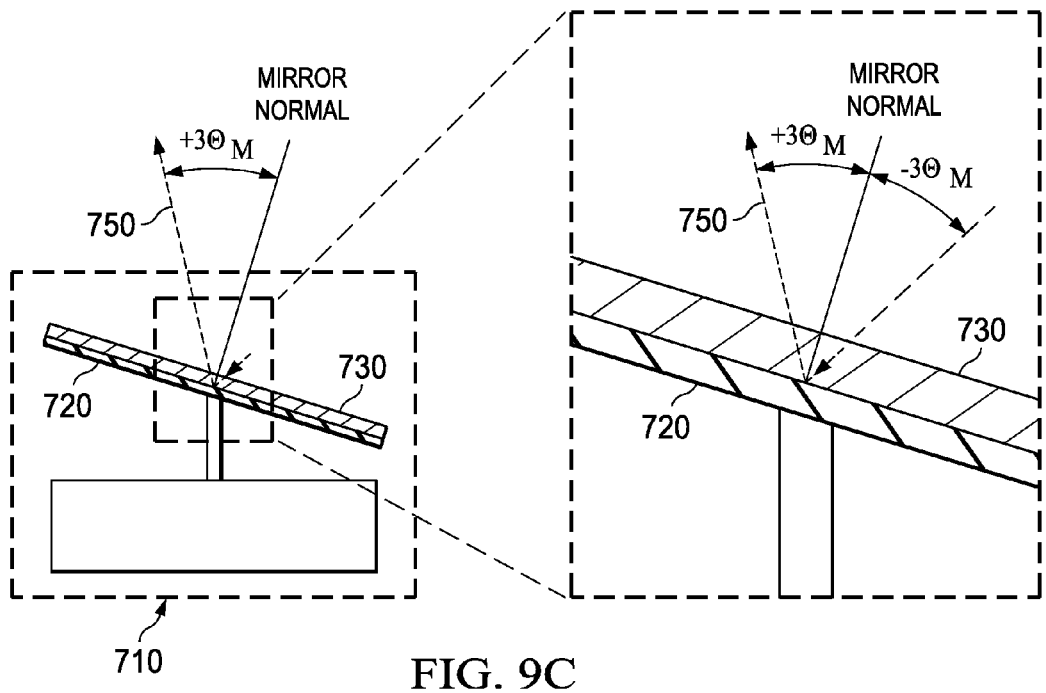
Figure 10A:
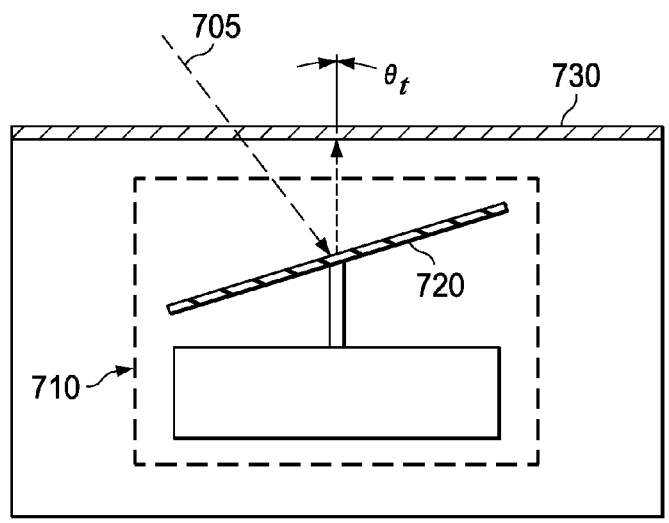
Figure 10B:
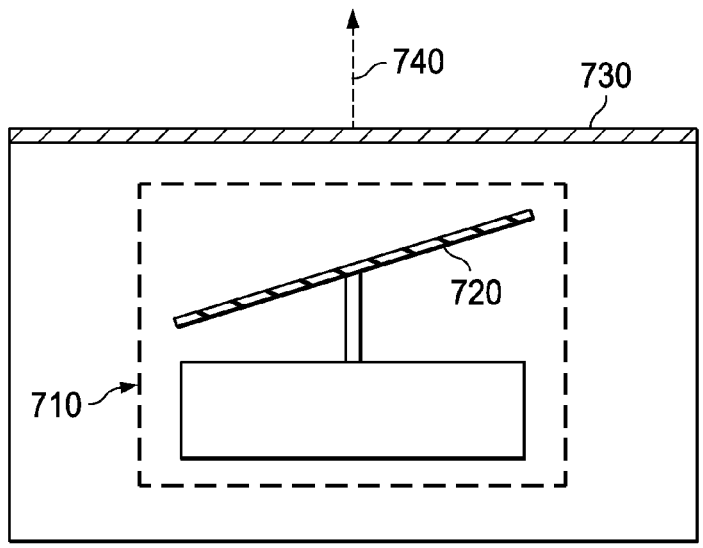
Figure 10C:
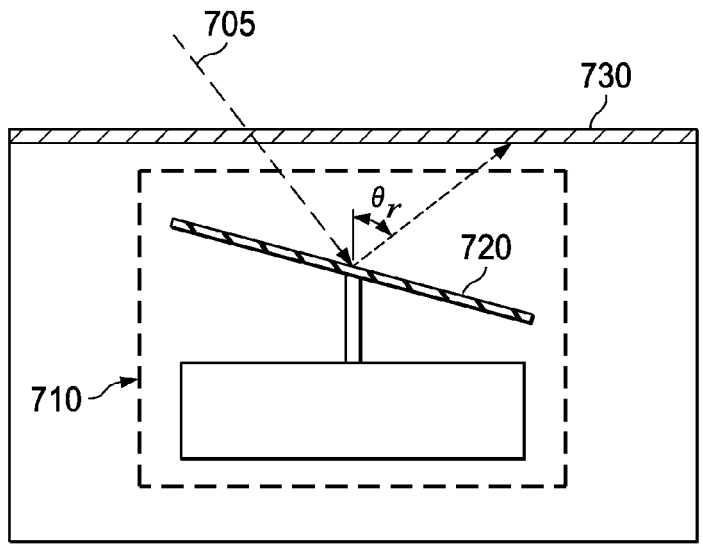
Figure 10D:
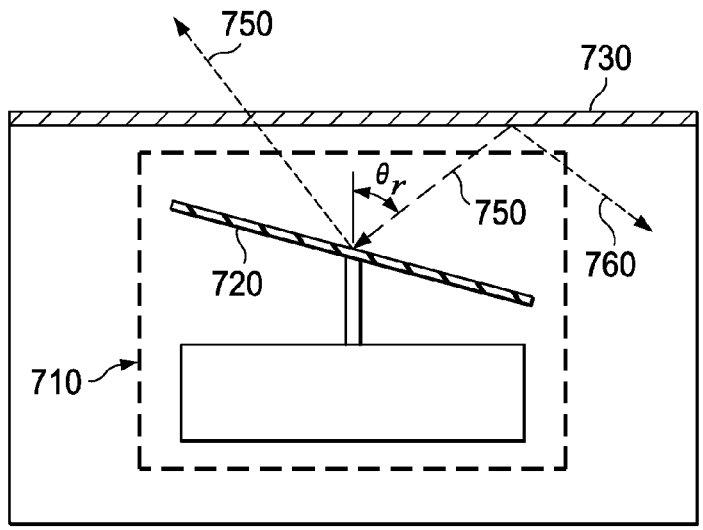

Yet another possibility is to design the angle-selective retro-reflector on the Micromirror surface as shown in FIG. 9A through 9C, for example wherein the angle-selective retro-reflector is positioned on individual micromirrors or pixels of the spatial light modulator. Even another possibility is to design the angle-selective retro-reflector on the Micromirror surface as shown in FIGS. 10A through 10D, for example wherein the angle-selective retro-reflector is positioned on a front window of the spatial light modulator.

Those skilled in the art to which the disclosure relates will appreciate that other and further additions, deletions, substitutions and modifications may be made to the described embodiments without departing from the scope of the disclosure.

What is claimed is:

1. A method for use in a display system that employs a spatial light modulator that comprises an array of individually addressable pixels, the method comprising:
    directing a light beam from a light source to an array of individually addressable pixels of a spatial light modulator;
    modulating the light beam into a first portion of light using a first addressable pixel, and a second portion of light using a second addressable pixel;
    directing the first portion of light having a first incident angle and the second portion of light having a second different incident angle toward an angle-selective retro-reflector, the angle-selective retro-reflector configured to transmit the first portion of light onto a display target, and reflect the second portion of light back toward the second addressable pixel; and
    recycling the reflected second portion of light to the pixels of the spatial light modulator.

2. The method of claim 1 wherein directing the first portion of light and the second portion of light toward an angle-selective retro-reflector includes directing toward a passive angle-selective retro-reflector.

3. The method of claim 2 wherein the passive angle-selective retro-reflector comprises a stack of wavelength tuned volume Bragg gratings, a stack of wavelength tuned holographic optical elements, or a z-chirped volume Bragg grating.

4. The method of claim 2 wherein the angle-selective retro-reflector is positioned on a front window of the spatial light modulator.

5. The method of claim 2 wherein the angle-selective retro-reflector is positioned on individual micromirrors or pixels of the spatial light modulator.

6. The method of claim 1 wherein directing the first portion of light and the second portion of light toward an angle-selective retro-reflector includes directing toward a switchable angle-selective retro-reflector.

7. The method of claim 1 wherein the switchable angle-selective retro-reflector comprises a single active acousto-optic Bragg grating, a phased array of active acousto-optic Bragg gratings, a single active polymer-dispersed liquid crystal grating, or multiple active polymer-dispersed liquid crystal gratings.

8. The method of claim 1 wherein a depth of focus of the light beam should be at least about twice a distance between the spatial light modulator and the angle-selective retro-reflector.

9. The method of claim 1 wherein recycling includes capturing the second portion of light using an optical integrator that comprises a substantially open end.

10. The method of claim 9 wherein the optical integrator is at a location such that an illumination field of the second portion of light at said open end of the optical integrator has an area that is substantially equal to or less than the area of said open end.

11. The method of claim 9 wherein the optical integrator comprises an opening formed on a side wall of the end of the optical integrator, and wherein the side wall has an interior surface that is covered by a reflective layer for reversing a propagation direction of the second portion of light inside the optical integrator.

12. The method of claim 9 wherein the optical integrator is positioned such that the opening in the side wall is aligned to the light beam from the light source.

13. The method of claim 1 wherein the spatial light modulator comprises a digital micromirror device having an array of individually addressable mirrors.

14. The method of claim 1 wherein the angle-selective retro-reflector is located in the spatial light modulator or on a front window of the spatial light modulator.

15. A display system, comprising:
    a light source configured to provide a light beam;
    a spatial light modulator located in optical communication with the light source and having an array of addressable pixels, wherein a first addressable pixel is configured to modulate the light beam into a first portion of light having a first incident angle, and a second addressable pixel is configured to modulate the light beam into a second portion of light having a second different incident angle;
    an angle-selective retro-reflector located proximate the spatial light modulator and configured to receive the first portion and the second portion, wherein the angle-selective retro-reflector is configured to transmit the first portion of light onto a display target, and reflect the second portion of light back toward the second addressable pixel;
    an OFF-state recycling mechanism placed in optical communication with the spatial light modulator, the recycling mechanism configured to capture the reflected second portion of light and redirect it back toward the spatial light modulator.

16. The system of claim 15 wherein the angle-selective retro-reflector is a passive angle-selective retro-reflector selected from the group consisting of:
    a stack of wavelength tuned volume Bragg gratings;
    a stack of wavelength tuned holographic optical elements; and
    a z-chirped volume Bragg grating.

17. The system of claim 15 wherein the angle-selective retro-reflector is a switchable angle-selective retro-reflector selected from the group consisting of:
    a single active acousto-optic Bragg grating;
    a phased array of acousto-optic Bragg gratings;

a single active polymer-dispersed liquid crystal grating; and multiple active polymer-dispersed liquid crystal gratings.

18. The system of claim 15 wherein a distance between the spatial light modulator and the angle-selective retro-reflector should be about one half or less of a depth of focus of the light beam.

19. The system of claim 15 wherein the OFF-state recycling mechanism comprises an optical integrator having a substantially open end.

20. The system of claim 19 wherein the optical integrator comprises an opening formed on a side wall of the end of the optical integrator, and wherein the side wall has an interior surface that is covered by a reflective layer for reversing a propagation direction of the second portion of light inside the optical integrator.

21. The system of claim 19 wherein the optical integrator is positioned such that the opening in the side wall is aligned to the light beam from the light source.

22. The system of claim 15 wherein the spatial light modulator comprises a digital micromirror device having an array of individually addressable mirrors.

23. The system of claim 15 wherein the first incident angle ranges from about zero to about 8 degrees from the surface normal of the angle-selective retro-reflector, and wherein the second different incident angle ranges from about 24.0 degrees to about 80.0 degrees as measured from the surface normal of the angle-selective retro-reflector.

24. The system of claim 15 wherein the light source comprises at least one laser light source.

25. The system of claim 15 wherein the spatial light modulator and the angle-selective retro-reflector are contained within a single package.

26. The system of claim 15 wherein the angle-selective retro-reflector is positioned on a front window of the spatial light modulator.

27. The system of claim 15 wherein the angle-selective retro-reflector is positioned on individual micromirrors or pixels of the spatial light modulator.

* * * * *